United States Patent [19]
Grube et al.

[11] Patent Number: 5,155,321
[45] Date of Patent: Oct. 13, 1992

[54] RADIANT HEATING APPARATUS FOR PROVIDING UNIFORM SURFACE TEMPERATURE USEFUL IN SELECTIVE LASER SINTERING

[75] Inventors: Kris W. Grube; Joseph J. Beaman, both of Austin, Tex.

[73] Assignee: DTM Corporation, Austin, Tex.

[21] Appl. No.: 611,309

[22] Filed: Nov. 9, 1990

[51] Int. Cl.$^5$ .............................................. B23K 26/00
[52] U.S. Cl. .............................. 219/121.6; 219/121.85
[58] Field of Search ............ 219/121.6, 121.85, 121.65, 219/121.66

[56] References Cited

U.S. PATENT DOCUMENTS 4,855,102 8/1989 Okada et al. ........................ 419/8

Primary Examiner—C. L. Albritton
Attorney, Agent, or Firm—Vinson & Elkins

[57] ABSTRACT

A radiant heater, and an apparatus for performing selective laser sintering using the same, are disclosed. The radiant heater is ring-shaped with its dimensions and distance from the target surface preferably defined to provide radiant energy to a target surface, with the rate of energy received per unit area of the target surface being substantially uniform. A frusto-conical ring-shaped radiant heater is also disclosed, which may be disposed closer to the surface to provide improved efficiency of heat transfer in a uniform fashion. A cooling element similarly shaped is also disclosed, which operates in the same manner to uniformly transfer radiant heat from the target surface. Zoning of the ring-shaped radiant heaters, to allow for non-uniform radiant energy emission to the target surface, is also disclosed. Monitoring of the temperature of the target surface is done by way of infrared sensors. For monitoring of cool temperatures, a second infrared sensor is directed at the radiant heater, so that compensation for reflection of the radiant heat from the surface may be accomplished.

24 Claims, 5 Drawing Sheets

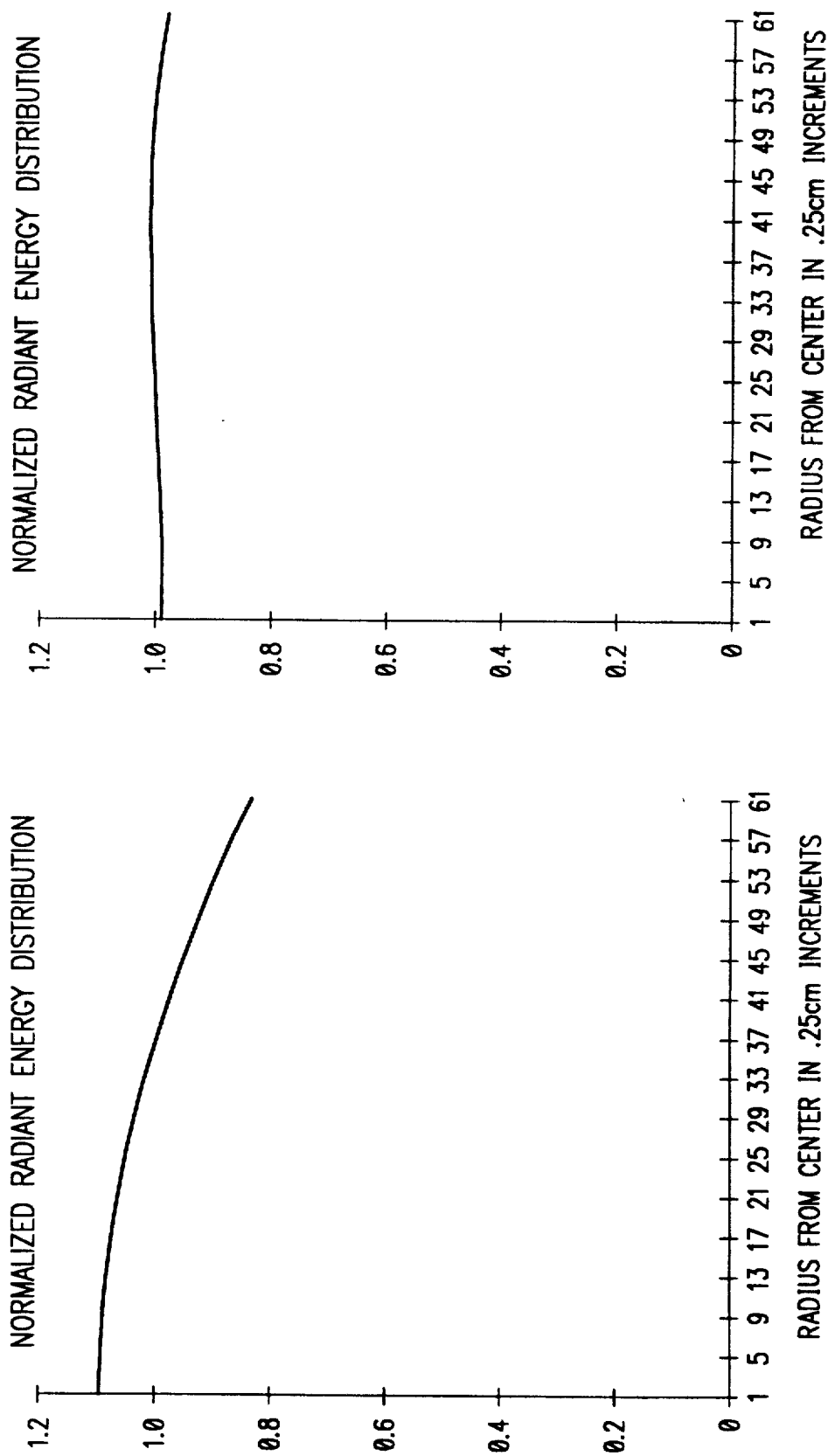

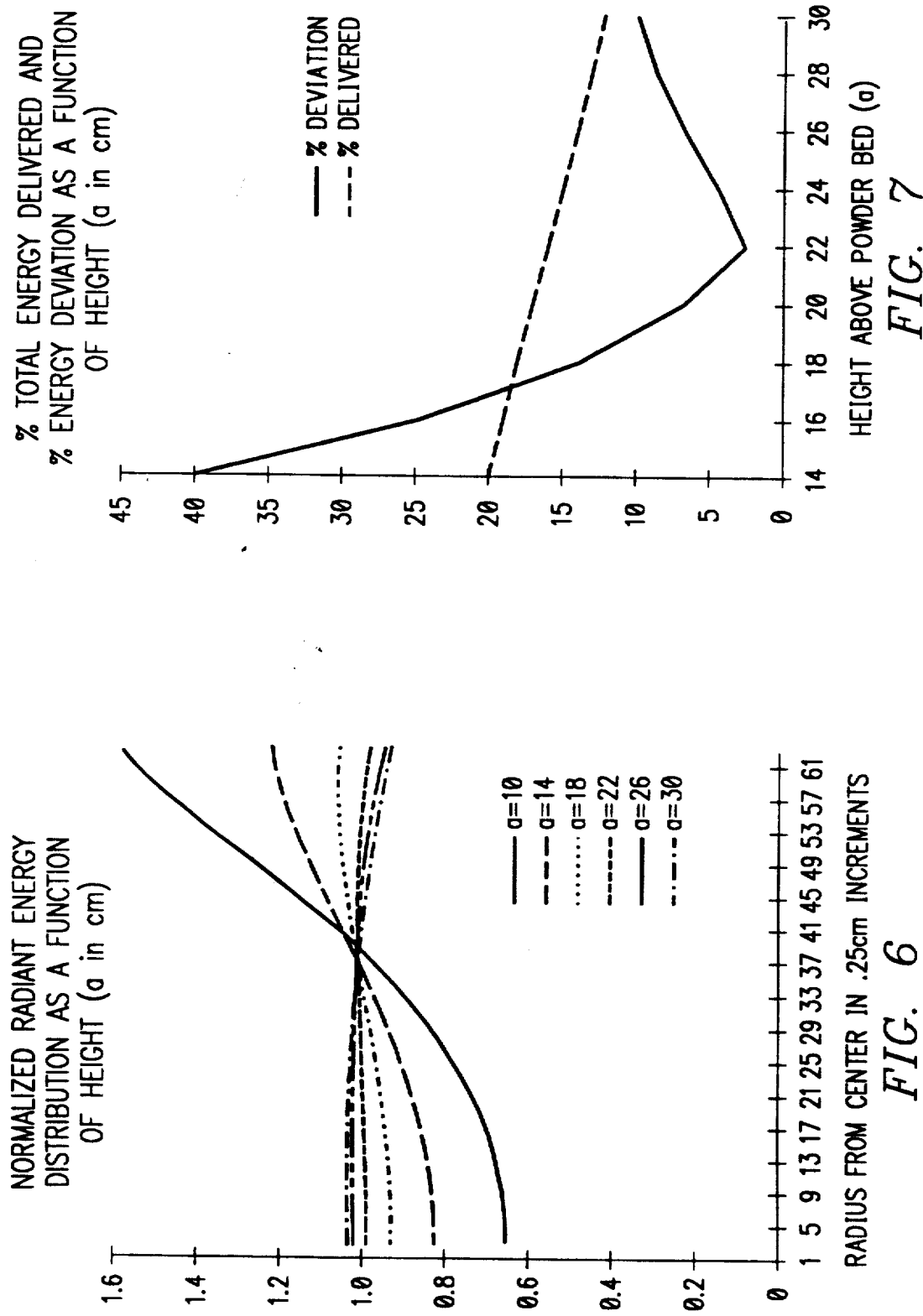

RADIANT HEATING APPARATUS FOR PROVIDING UNIFORM SURFACE TEMPERATURE USEFUL IN SELECTIVE LASER SINTERING

This invention is in the field of radiant heating, and is more particularly directed to radiant heating in selective laser sintering.

BACKGROUND OF THE INVENTION

Selective laser sintering is a relatively new method for producing parts and other freeform solid articles in a layer-by-layer fashion. This method forms such articles by the mechanism of sintering, which refers to any process by which particulates are made to form a solid mass through the application of external energy. According to selective laser sintering, the external energy is focused and controlled by controlling a laser to sinter selected locations of a heat-fusible powder. By performing this process in layer-by-layer fashion, complex parts and freeform solid articles which cannot be fabricated easily (if at all) by subtractive methods such as machining can be quickly and accurately fabricated. Accordingly, this method is particularly beneficial in the production of prototype parts, and is particularly useful in the customized manufacture of such parts and articles directly from computer-aided-design data bases.

Selective laser sintering is performed by depositing a layer of a heat-fusible powder onto a target surface; examples of the types of powders include metal powders, polymer powders such as wax that can be subsequently used in investment casting, ceramic powders, and plastics such as ABS plastic, polyvinyl chloride (PVC), polycarbonate, and other polymers. Portions of the layer of powder corresponding to a cross-sectional layer of the part to be produced are exposed to a focused and directionally controlled energy beam, such as generated by a laser having its direction controlled by mirrors, under the control of a computer. The portions of the powder exposed to the laser energy are sintered into a solid mass in the manner described hereinabove. After the selected portions of the layer have been so sintered or bonded, another layer of powder is placed over the layer previously selectively sintered, and the energy beam is directed to sinter portions of the new layer according to the next cross-sectional layer of the part to be produced. The sintering of each layer not only forms a solid mass within the layer, but also sinters each layer to previously sintered powder underlying the newly sintered portion. In this manner, the selective laser sintering method builds a part in layer-wise fashion, with flexibility, accuracy, and speed of fabrication superior to conventional machining methods.

The selective laser sintering process, and apparatus for performing the process, is described in further detail in U.S. Pat. No. 4,863,538, issued Sep. 5, 1989, U.S. Pat. No. 4,938,816, issued Jul. 3, 1990, U.S. Pat. No. 4,944,817, issued Jul. 31, 1990, and PCT Publication WO 88/02677, published Apr. 21, 1988, all of which are incorporated herein by this reference.

A problem faced by those in the selective laser sintering field is the warpage and shrinkage of the part due to thermal effects. Such warpage may manifest as the curling of a sintered layer in such a manner that it does not bond to the previously sintered layer directly therebelow; another manifestation of this warpage occurs even though the layers of the part bond together, but where the part itself warps, for example where a bottom flat surface curls up at the edges to become a curved surface, concave up. It is believed that a significant cause of this warpage is the thermal shrinkage of the sintered layer from its temperature during sintering to its post-sintering temperature, an extreme case of which causes the individual layers to not bond to one another. In addition, uneven cooling of the part during its layer-wise manufacture, for example where top layers of the part are cooled more quickly than bottom layers, has been observed to cause warpage and curling.

It has been observed that control of the temperature of the article being produced is an important factor in reducing such warpage. An apparatus for controlling the part temperature is described in the above-referenced PCT Publication WO 88/02677, which provides a draft of temperature-controlled air through the target area (i.e., through the powder and the part being produced). Such control by this draft is believed to reduce the temperature differential that the part is exposed to during and after the sintering process, reducing shrinkage from cooling, and to maintain the temperature of previously sintered layers at high enough temperature to allow relaxation.

Another significant problem faced by those in the field of selective laser sintering is undesired growth of the part being produced beyond the volume defined by the energy beam. As is well known, the spot size of a laser beam can be made quite small, so that according to the selective laser sintering method which defines the volume of the part by the laser scan, the resolution of the part being produced can theoretically be quite high. However, conduction of heat resulting from the sintering can cause particles of the powder outside the laser scan to sinter to the directly sintered portion. This causes the cross-sectional layer to be larger than that defined by the laser scan. In addition, growth can occur from layer to layer, for example where sufficient heat from sintering remains in the sintered portion of the layer at the time that the next layer of powder is disposed thereover, so that the next powder layer sinters to the prior layer without exposure to the laser beam. The downdraft apparatus described hereinabove was found to provide transfer of bulk heat from the layer being sintered, reducing the extent of such interlayer growth.

However, the use of convection temperature control is limited in its accuracy in uniformly controlling the temperature of the layer being produced. This is due to the undefined and non-uniform path that the air draft necessarily must follow as it passes through the part being produced (the definition of the part controlling the path of the draft). Accordingly, another technique that has been used in attempts to control the temperature of the part being produced has been radiant heaters placed near the target surface. Such radiant heaters have included floodlamps, quartz rods, and conventional flat radiant panels.

Referring to FIG. 1, a prior apparatus including flat radiant panels in providing radiant heat to the selective laser sintering target surface will now be described. The apparatus shown in FIG. 1 is a schematic representation of the SLS Model 125 DeskTop Manufacturing system manufactured and sold by DTM Corporation. The apparatus of FIG. 1 includes a chamber 2 (front doors and the top of chamber 2 are not shown in FIG. 1, for purposes of clarity), within which the selective sintering process takes place. Target surface 4, for purposes of the description herein, refers to the top surface of heat-fusible powder (including portions previously sintered, if present) disposed on part piston 6. The vertical motion of part piston 6 is controlled by motor 8. Laser 10 provides a beam which is reflected by galvanometer-controlled mirrors 12 (only one of which is shown for clarity), in the manner described in the U.S. Patents referred to hereinabove. Powder piston 14 is also provided in this apparatus, controlled by motor 16. As described in the above-referenced PCT Publication 88/02677, counter-rotating roller 18 is provided to transfer the powder to the target surface 4 in a uniform and level fashion.

In operation, the apparatus of FIG. 1 supplies powder to chamber 2 via powder cylinder 14; powder is placed into chamber 2 by the upward partial motion of powder cylinder 14 provided by motor 16. Roller 18 (preferably provided with a scraper to prevent buildup, said scraper not shown in FIG. 1 for clarity) spreads the powder within the chamber by translation from powder cylinder 14 toward and across target surface 4 at the surface of the powder on top of part piston 6, in the manner described in said PCT Publication 88/02677. At the time that roller 18 is providing powder from powder piston 14, target surface 4 (whether a prior layer is disposed thereat or not) is preferably below the floor of chamber 2 by a small amount, for example 5 mils, to define the thickness of the powder layer to be processed. It is preferable, for smooth and thorough distribution of the powder, that the amount of powder provided by powder cylinder 14 be greater than that which can be accepted by part cylinder 6, so that some excess powder will result from the motion of roller 18 across target surface 4; this may be accomplished by the upward motion of powder piston 14 by a greater amount than the distance below the floor of chamber 2 that target surface 4 is set at (e.g., 10 mils versus 5 mils). It is also preferable to slave the counter-rotation of roller 18 to the translation of roller 18 within chamber 2, so that the ratio of rotational speed to translation speed is constant.

Further in operation, after the transfer of powder to target surface 4, and the return of roller 18 to its original position near powder piston 14, laser 10 selectively sinters portions of the powder at target surface 4 corresponding to the cross-section of the layer of the part to be produced, in the manner described in the above-referenced U.S. Patents and PCT Publication. After completion of the selective sintering for the particular layer of powder, part piston 6 moves downward by an amount corresponding to the thickness of the next layer, awaiting the deposition of the next layer of powder thereupon from roller 18.

Radiant heat panels 20 are provided in this prior apparatus of FIG. 1, suspended from the roof of chamber 2 (in a manner not shown). Radiant heat panels 20 in this prior arrangement are conventional flat rectangular heat panels, each of which emit energy per unit area substantially uniformly across its surface. In this arrangement, radiant heat panels 20 are separated from one another to allow the beam from laser 10 to pass therebetween, and are disposed at an angle relative to target surface 4, to heat target surface 4 so that the surface temperature can be controlled to reduce growth and curling, as described hereinabove.

Temperature non-uniformity at target surface 4 has been observed in use of the arrangement of FIG. 1. Such non-uniformity in target surface temperature can allow growth at one portion of the part being produced (i.e., at the hottest location) simultaneously with curling or other warpage at another portion of the part (i.e,. at the coolest location). Accordingly, for the apparatus of FIG. 1, this non-uniformity makes it difficult to optimize the temperature at the surface target 4 in order to keep either of these deleterious effects from occurring.

It should also be noted that uniform radiant heating of a surface may theoretically be accomplished by providing a flat radiant heating element placed parallel to the surface being heated, and of effectively infinite size relative to the target surface. In the use of such a heater in a closed chamber, however, it is not practicable to provide such a large heater, as excessively large chambers reduce the ability to control the ambient temperature therein, and are not preferred for commercial applications due to the associated cost of requiring a large "footprint". It should also be noted that such a flat heater is necessarily not compatible with selective laser sintering, as no opening for the laser is provided therethrough.

It is therefore an object of this invention to provide a radiant heater which delivers energy to a substantially planar surface distanced therefrom in such a manner that the total energy per unit area incident upon the planar surface is substantially uniform.

It is a further object of this invention to provide such a heater which results in uniform temperature at a planar surface distanced therefrom.

It is a further object of this invention to provide such a radiant heater having an opening in its center.

It is a further object of this invention to provide such a radiant heater which is particularly adapted for use in an apparatus for selective laser sintering.

It is a further object of this invention to provide an apparatus for selective laser sintering having such a radiant heater.

It is a further object of this invention to provide such a radiant heater having controllable segments therein, to allow for adjustment of the surface temperature.

Other objects of this invention will be apparent to those of ordinary skill in the art having reference to the following specification, together with the drawings.

SUMMARY OF THE INVENTION

The invention may be incorporated into a ring-shaped element for transferring radiant energy to or from a planar surface parallel thereto. The center opening of the ring allows for a laser beam to pass therethrough, as is useful, for example, in selective laser sintering. The dimensions of the element, such as the inner and outer radius, are selected relative to the distance that the heated or cooled surface is to be located from the element. A frusto-conical ring-shaped heater or cooling element allows for the placement of the element closer to the target surface while still maintaining uniformity, improving the efficiency of heat transfer to or from the target surface. In the case of a radiant heater, zoning may be incorporated therein, either with separately controlled zones or, alternatively, permanently installed non-uniformity in energy emission per unit area, to compensate for non-uniform external thermal disturbances.

BRIEF DESCRIPTION OF THE DRAWINGS

FIGS. 4 and 5 are plots of transferred energy rate per unit area for a conventional radiant heater and the heater according to FIGS. 2 and 3, respectively.

FIGS. 6, 7 and 8 are plots illustrating the dependence of the transferred energy rate per unit area on particular dimensions of the radiant heater according to the first embodiment.

DETAILED DESCRIPTION OF THE PREFERRED EMBODIMENTS

Figure 2:
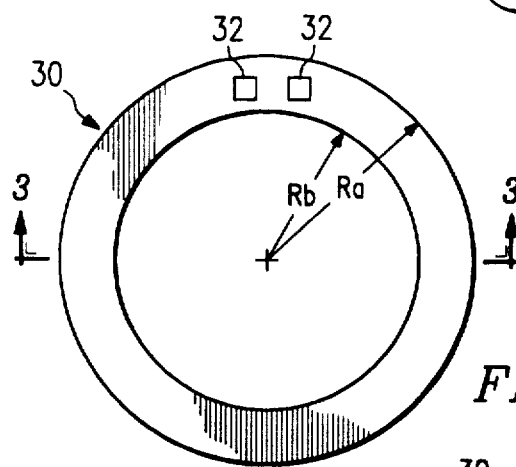
FIG. 2 is a plan view of a radiant heater according to a first preferred embodiment of the invention.
Figure 3:
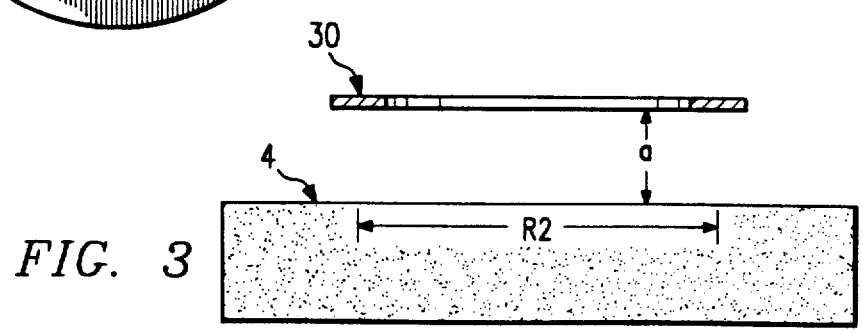
FIG. 3 is an elevation of the radiant heater of FIG. 2 shown in relation to the surface to be heated.

Referring now to FIGS. 2 and 3, a first preferred embodiment of the invention will now be described in detail. Radiant heater 30 in this first preferred embodiment of the invention is an electrical resistance heater having connections 32, such as pads to which wires may be soldered, at a face thereof. Heater 30 generates heat resulting from a current passing therethrough between pads 32. The resistive material within heater 30 may be resistive filaments conventional in radiant heaters, such as etched foil or nickel chromium wire.

Alternatively, the material of the ring itself may serve as the resistive and heat-generating material; in this case, it is preferable that heater 30 include a gap or dielectric barrier between pads 32 (i.e., the short direction of travel), so that the current is forced to travel around heater 30, improving its efficiency. Alternatively, pads 32 may be spaced diametrically opposite one another on the face of heater 30, so that the current will travel in equal portions along the sides of heater 30. This is most likely less efficient, however, as heater 30 would in that case be effectively two resistors in parallel, so that lower resistance results, in turn reducing the $I^2R$ power dissipation and heat generation of heater 30.

It is contemplated that other configurations and locations of pads 32 on heater 30 will now be apparent to those of ordinary skill in the art having reference to this description.

It should be noted that experiments using a radiant heater 30 according to this embodiment of the invention have been performed, as will be described hereinbelow, using a conventional ring-shaped conduction heater as radiant heater 30. This conventional element used as heater 30 is an 1800 Watt ring-shaped strip heater, sold as Chromalux model A-903/240. The Chromalux strip heater is manufactured and sold as a conduction heater for heating vats and other containers for liquids and the like.

It is believed that the dimensions of a ring-shaped radiant heater 30 according to this embodiment of the invention, relative to the distance between heater 30 and the surface to be heated, are quite important in providing a high degree of uniformity of temperature at the surface to be heated. Modeling of the heat transfer of such a radiant heater may be used to determine these dimensions, as will now be described in detail.

According to fundamental heat transfer theory, the rate q of energy transfer between a source body (body 1) and a target body (body 2) by means of radiation can be expressed as follows:

$$q = F_E F_G \sigma A_1 (T_1^4 - T_2^4)$$

where $F_E$ is an emissivity factor dependent upon the emissivities of the two bodies, $F_G$ is a geometric "view factor" as described hereinbelow, $\sigma$ is the Stefan-Boltzmann constant, $A_1$ is the area of the source body, and $T_1$ and $T_2$ are the temperatures of the source and target bodies, respectively. See, for example, Holman, *Heat Transfer*, 2d Ed. (McGraw-Hill, 1963).

Where the source body is a diffuse surface, as in the example applicable to radiant heater 30, radiant energy is emitted in isotropic fashion. Accordingly, only a fraction of the emitted energy emitted from the source body actually reaches the target body, dependent of course upon the geometries of the source and target bodies. The geometric view factor $F_G$ is thus used in the above relationship to provide the fraction of the energy emitted by the source body which reaches the target body. Holding all other factors equal, the dependency of the energy transfer rate q as a function of the geometry of the source body, and as a function of the location of the target body of interest, can be determined. Preferably, a computer modeling program can be used to perform the calculations necessary in this determination.

It should be noted that calculation of the view factor $F_G$ can be quite complicated, even for simple geometries. Well-known references in the heat transfer field have published view factors and algebraic principles by which the view factors can be determined for particular non-tabulated geometries. See, for example, Howell, *Radiation Configuration Factors* (McGraw-Hill). For example, it is well-known that the view factors between parallel coaxial disks may be expressed as follows:

$$F_{1 \to 2} = \frac{1}{2} \{ X - [X^2 - 4(R_2/R_1)^2]^{\frac{1}{2}} \}$$

where $F_{1 \to 2}$ is the view factor for the source disk to the target disk, where $R_1$ and $R_2$ are the radii of the source and target disks, respectively, each divided by the distance between the disks (shown as distance a in FIG. 3), and where $$X = 1 + (1 + R_2^2)/R_1^2$$

For a ring-shaped source disk such as radiant heater 30, and for a circular target surface, algebraic view factor principles have been used to derive the view factor $F_{1R \to 2}$ by first calculating two view factors $F_{1 \to 2a}$ and $F_{1 \to 2b}$ according to the above relationships; these view factors correspond to those from a disk source 1 to two concentric disk targets 2a and 2b, where the radius of disk 2a is larger than that of disk 2b. The view factor $F_{1R \to 2}$ from a ring source having an outer radius $R_a$ the same as disk target 2a and an inner radius $R_b$ the same as disk target 2b can then be calculated from the view factors $F_{1 \to 2a}$ and $F_{1 \to 2b}$ as follows:

$$F_{1R \to 2} = (F_{1 \to 2a} - F_{1 \to 2b}) A_1 / (A_{2a} - A_{2b})$$

Referring to FIG. 2, radiant heater 30 is shown as having an outer radius $R_a$ and an inner radius $R_b$, corresponding to the convention used in the above expression.

In order to determine the uniformity of the energy distribution across the target surface, it is necessary to consider the above-derived view factor not for the target surface (i.e., body 2) as a whole, but for small portions thereof; uniformity can of course be then measured by comparison of the energy transfer rate q for the various portions of the target surface. Since the source body in this analysis is ring-shaped, and is parallel and coaxial with the target surface, it can be assumed that the view factor (and accordingly the energy transfer rate) will be equal for all portions of the target surface which are the same radial distance from the center of the target. Accordingly, the view factor from the ring-shaped source body to a differential ring-shaped element of the target body can be easily derived from algebraic view factor principles, as follows:

$$F_{1R \to 2R} = F_{1R \to 2}|_{r + \Delta r} - F_{1R \to 2}|_r$$

This calculates the view factor to a differential ring-shaped portion of the target body or surface, having an inner radius of r and an outer radius of $r + \Delta r$. Comparison of the energy transfer rate q for each of the ring-shaped portions of the target surface can thus be done by calculating the view factor $F_{1R \to 2R}$ for the differential elements of the target surface, and dividing each of the calculated view factors by the area of the differential target element, to arrive at the energy transfer rate density (i.e., the rate q per unit area).

Referring now to FIGS. 4 and 5, a comparison of the uniformity of energy transfer from a disk-shaped flat radiant heater, as may be conventionally used, to that from the ring-shaped radiant heater 30 according to the first embodiment of the invention, will now be described. The plots of FIGS. 4 and 5 were derived using the heat transfer model described hereinabove.

Referring to FIGS. 2 and 3, as illustrative of the dimensions of the system modeled, the radius of the disk-shaped heater modeled relative to FIG. 4 was 21.8 cm, equal to the outer radius $R_a$ of the ring-shaped heater modeled relative to FIG. 5. The inner radius $R_b$ of the modeled radiant heater 30 was 15.25 cm. For both FIG. 4 and FIG. 5, the distance a between the modeled heaters and target surface 4 (see FIG. 3) in the model was 22 cm, the radius $R_2$ of target surface 4 was 15 cm, and the incremental distance $\Delta r$ was 0.25 cm.

FIG. 4 illustrates the results of the modeling for a conventional disk-shaped heater, normalized relative to the mean energy transfer density (i.e., q/unit area) over target surface 4. It can be concluded from the results of FIG. 4 that use of such a conventional disk-shaped heater would result in the temperature at the center of target surface 4 being higher than that at the perimeter. FIG. 5, illustrating the results of the modeling for a ring-shaped radiant heater 30 according to this embodiment of the invention, shows significantly improved uniformity over that of the disk-shaped heater modeled as resulting in FIG. 4.

In a similar fashion, modeling of a ring heater matching the dimensions of the Chromalux conduction heater noted hereinabove, and experimental measurements for the Chromalux heater itself, were performed to verify the model. The dimensions of the modeled and actual Chromalux heater included an outer radius $R_a$ of 13.93 cm, and an inner radius $R_b$ of 10.79 cm. The numerical results of this modeling predicted that the maximum deviation (i.e., difference between minimum and maximum) in percent energy transferred per unit area for the radiant heater 30 according to the dimensions of the Chromalux heater would be approximately 24.5%.

Figure 1:
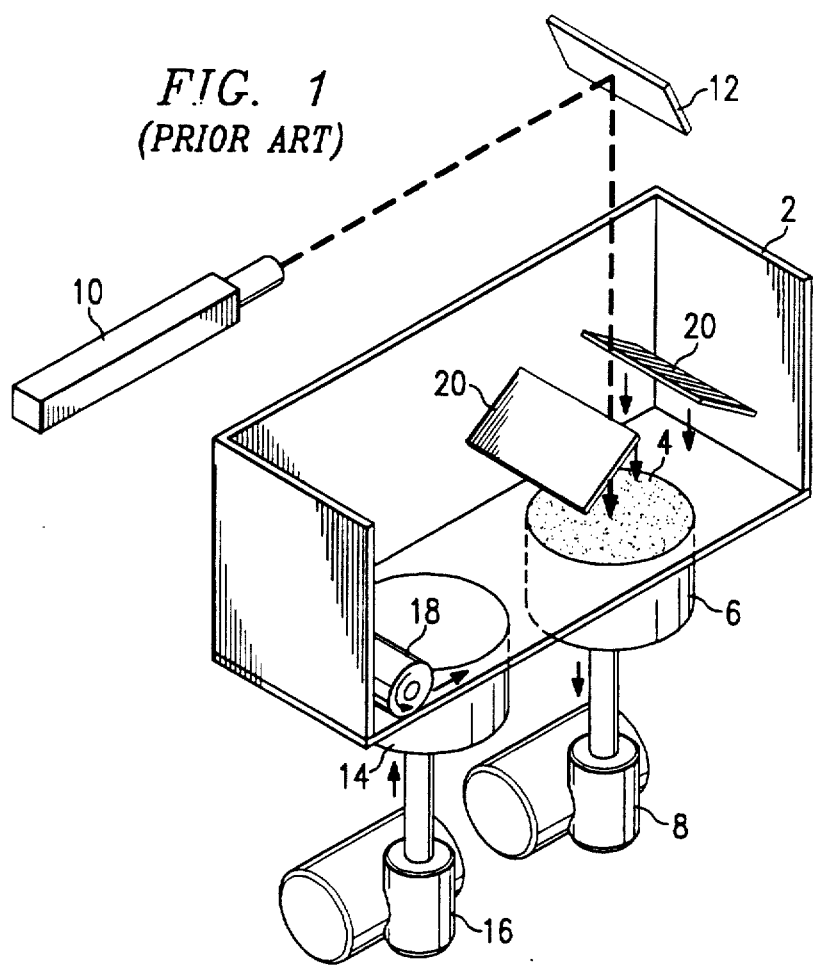
FIG. 1 is an isometric and schematic illustration of an apparatus for selective laser sintering according to the prior art.

Measurements were made for an 1800 watt Chromalux conduction heater placed in an apparatus as shown in FIG. 1, controlled to raise the temperature of target surface 4 from an ambient temperature of 23° Celsius to approximately 70° Celsius. The total measured deviation in temperature of target surface 4 (measured by way of thermocouples), calculated in percent deviation from the ambient temperature, was approximately 19.4%, closely matching the modeled energy transfer deviation result discussed hereinabove. It is therefore believed that the model described hereinabove is quite accurate in predicting the uniformity of energy transfer from a radiant heater such as radiant heater 30 to a parallel surface distanced therefrom.

It should be noted that while the Chromalux conduction heater example will provide improved results over a similarly sized disk heater, the dimensions of the example of radiant heater 30 modeled relative to FIG. 5 are believed to be preferable to those of the Chromalux conduction heater.

Accordingly, as shown in FIG. 5, radiant heater 30 according to this embodiment of the invention thus provides significant improvements in the temperature uniformity of a parallel target surface, compared to prior radiant heater configurations.

It has also been observed from modeling and experimentation that variation of certain dimensions in radiant heater 30, such as the distance a between radiant heater 30 and target surface 4 for a given size of radiant heater 30, and such as the width of the ring (i.e., the difference between the outer and inner radii $R_a$ and $R_b$), can significantly affect the uniformity at which energy is delivered to target surface 4.

Referring to FIGS. 6 and 7, the effects of varying the distance a between radiant heater 30 and target surface 4 are shown, as the result of heat transfer modeling performed in the manner described hereinabove. The dimensions of radiant heater 30 which are modeled for purposes of FIGS. 6 and 7 are the same as modeled for FIG. 5.

FIG. 6 illustrates the modeled normalized radiant energy distribution of a ring-shaped radiant heater 30 as a function of distance a from target surface 4. As shown in FIG. 6, when radiant heater 30 is close to target surface 4, the perimeter of target surface 4 receives energy at a disproportionately high rate relative to the center, while with radiant heater 30 sufficiently distant from target surface 4, the balance changes so that the center of target surface 4 receives energy at a higher rate per unit area than the perimeter. Referring to FIG. 7, the percent deviation (calculated from the results used to generate FIG. 6) is plotted versus distance a between radiant heater 30 and target surface 4, together with the percent of total energy emitted by radiant heater 30 which is delivered to target surface 4. It can be seen that the deviation is at its minimum at a distance a of 22 cm; it can also be seen that the efficiency of energy delivery to target surface 4 decreases with increasing distance a, as would be expected. Accordingly, the distance a between radiant heater 30 and target surface 4 is a significant factor not only in the amount of radiant energy delivered to target surface 4, but also in the uniformity of such delivery.

Figure 8:
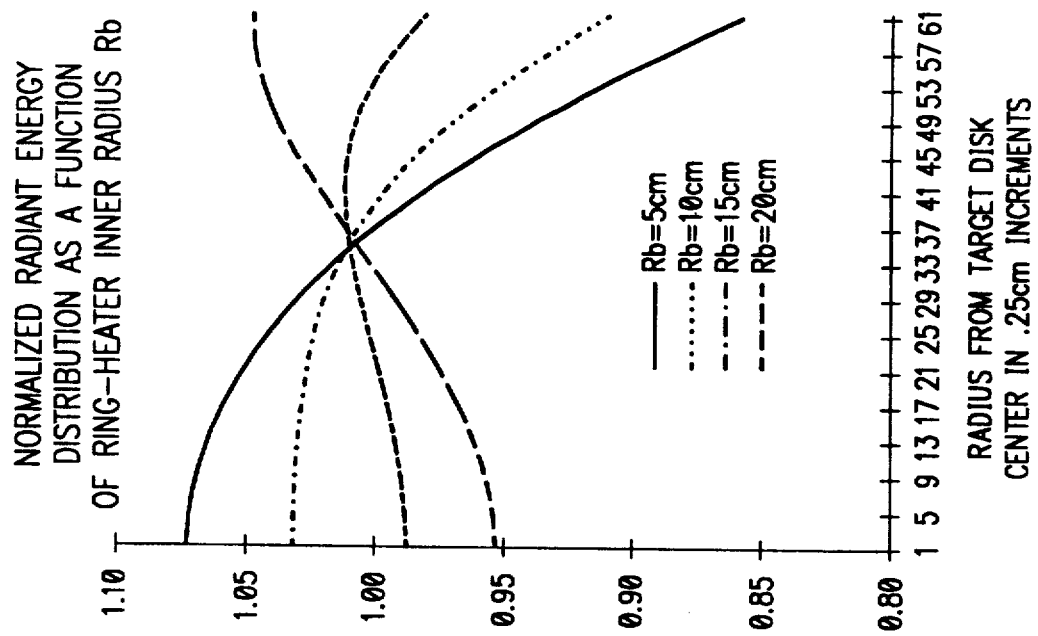

Referring now to FIG. 8, the effects of varying the width of the ring (i.e., varying the inner radius $R_b$ of FIG. 2) on the uniformity of energy delivery to the target surface will now be described. The conditions modeled in arriving at the results of FIG. 8 include a fixed outer radius $R_a$ of radiant heater 30, and a fixed distance a between radiant heater 30 and target surface 4. It can be seen that as the inner radius $R_b$ increases (resulting in a narrower ring), the perimeter of target surface 4 receives energy at a higher rate per unit area than the center; conversely, as the inner radius $R_b$ decreases (resulting in a wider ring, more closely approximating a disk-shaped heater as described hereinabove), the center of target surface 4 receives energy at a higher rate per unit area than the perimeter thereof.

It is contemplated that the relationships described hereinabove for modeling the dimensions of the ring-shaped radiant heater 30, relative to the distance between radiant heater 30 and target surface 4, can now be utilized by one of ordinary skill in the art to design radiant heater 30, for a particular application, in such a manner as to achieve the benefits of uniform energy transfer rate per unit area as described hereinabove.

It should be noted that the theory, shape, and geometric characteristics described hereinabove for radiant heater 30 are believed to be equally applicable where, instead of a heater, the ring-shaped element serves to cool the planar surface parallel thereto. Such a cooling element may be constructed as a similarly shaped body as radiant heater 30, and with conduits therein through which a cooling medium may be circulated. For example, an aluminum body with conduits may be provided, due to the high thermal conductivity of aluminum, through which a chilled fluid such as liquid nitrogen, a fluorocarbon or water, is circulated. It is thus contemplated that placement of the ring-shaped cooling element near a surface to be cooled will result, according to the theory and relationship described hereinabove for the radiant heater, in substantially uniform transfer of radiant heat from the surface to be cooled to the ring-shaped cooling element.

Figure 9:
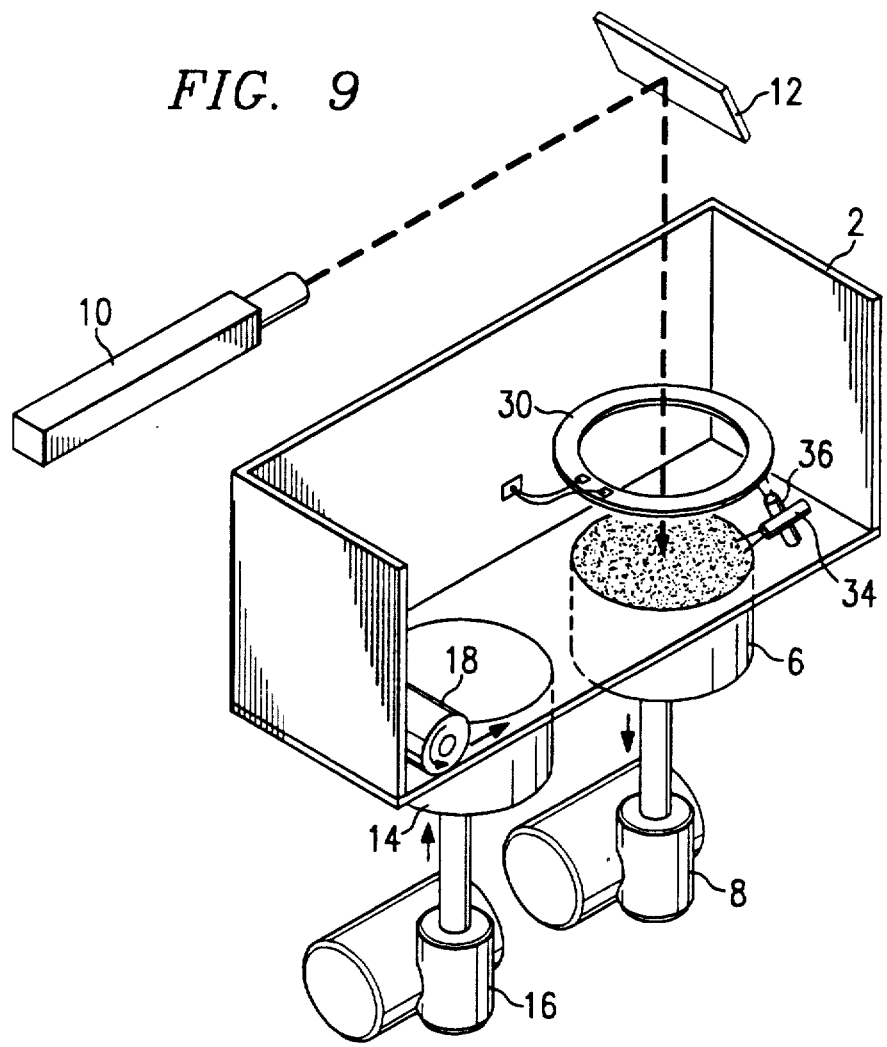
FIG. 9 is an isometric view of an apparatus for selective laser sintering incorporating the radiant heater according to the embodiment of FIGS. 2 and 3.

For the particular application of selective laser sintering, radiant heater 30 according to this embodiment of the invention is especially beneficial. This is not only due to the improved uniformity with which it delivers energy per unit area, but also due to its construction which allows its placement coaxial with the target surface, while allowing the energy beam to pass therethrough to target surface 4. Referring now to FIG. 9, a preferred embodiment of an apparatus for selective laser sintering including radiant heater 30 according to this embodiment of the invention will now be described. It should be noted that the same elements of this apparatus as are included in the prior apparatus of FIG. 1 are referred to by the same reference numerals.

Ring-shaped radiant heater 30, as described hereinabove, is used in the embodiment of FIG. 9 to uniformly heat target surface 4, in the manner described hereinabove. Attachment of radiant heater 30 may be accomplished by its suspension over target surface from the top of chamber 2 (such top not shown), either by chains, wire, a fixed bracket, or other appropriate mounting apparatus. As shown in FIG. 9, the opening through radiant heater 30 allows the beam from laser 10, controlled by mirrors 12, to pass therethrough and impact target surface 4, while still allowing radiant heater 30 to be coaxial with circular target surface 4. This allows for temperature uniformity of target surface over the area which can be reached by the beam of laser 10. Such uniform temperature control allows the temperature of target surface 4 to be optimized so that growth and curling of the part produced by the selective laser sintering process noted hereinabove is minimized.

It should be noted that radiant heater 30 may be incorporated into a selective laser sintering apparatus in such a manner that the temperature can be set at target surface 4 prior to initiation of selective laser sintering (measured, for example, by thermocouples or thermometers placed at target surface 4), with no further control of temperature performed during the process. Due to the generation of heat during selective laser sintering, however, the temperature of target surface 4 will likely change from its initial condition prior to the process. For particular materials such as wax, it has been observed that close control of the temperature throughout the process is necessary to avoid the problems of growth, curling, and other warpage and distortion of the part being produced. Accordingly, it is preferred that some type of measurement, feedback and control is included in the selective laser sintering apparatus.

Prior methods for control of the temperature of target surface 4, where radiant heaters such as panels 20 in FIG. 1 were used, incorporated thermocouples at or near target surface 4, for example located near the top of part piston 6. It is preferred in this embodiment, however, that the temperature measurement of the target surface 4, the powder disposed thereon by roller 18, and the part being produced in the powder by the selective laser sintering method, be made by non-contact techniques. Accordingly, the preferred embodiment of the apparatus of FIG. 9 includes an infrared temperature sensor 34, directed at the appropriate portion of target surface 4, including the powder and part produced thereat. The output of sensor 34 can be monitored by conventional equipment (not shown), for controlling the current or other energy applied to radiant heater 32.

Certain of the materials used in selective laser sintering must be kept at relatively low temperatures in order to remain in powder form. For example, it has been found that selective laser sintering is especially beneficial in producing parts from wax powder, with the wax parts subsequently used in the manufacture of molds for investment casting according to the "lost wax" technique. Selective laser sintering of wax powder is subject to growth and curling problems as described hereinabove, necessitating temperature control of target surface 4. However, the ambient temperature of chamber 2 must be kept relatively low, for example on the order of less than 50° C., so that the portions of the wax powder which do not receive energy from the laser do not melt or stick together. Accordingly, the temperature to be sensed by sensor 34 may be relatively low.

In the sensing of such low temperature, however, the amount of infrared wavelength energy from radiant heater 30 which is reflected off of the powder at target surface 4, reaching sensor 34, can be significant relative to the infrared energy radiated from the powder itself at such low temperatures. Accordingly, it has been observed that the temperature sensed by infrared sensor 34 differs from the temperature sensed by a thermocouple located at target surface 4.

In the apparatus of FIG. 9, the accuracy of the temperature measurement is improved by the provision of a second infrared sensor 36 directed at radiant heater 32 to measure its radiation. The output of sensor 36 is similarly monitored as the output of sensor 34. Infrared sensor 36 thus provides direct measurement of the radiation emitted by radiant heater 30. This allows compensation of the sensed radiation from target surface 4 by sensor 34 for the reflected radiation from heater 30, so that the correct temperature of the powder and part at target surface 4 may be derived. The amount of compensation necessary will depend upon various factors, such as the geometric relationship between the heater, powder bed, and sensors, the reflectivity of the powder, and the temperature of the powder. It is contemplated that time-zero characterization of chamber 2 and radiant heater 30, using thermocouples or other contact measurement in such characterization, may be done for particular powders over temperature to provide a compensation curve or equation for correcting the output signal from sensor 34 to arrive at the correct temperature.

Alternatively to the use of ring-shaped radiant heater 30 in the selective laser sintering apparatus of FIG. 9, a similarly shaped element may be used as a cooling element. As noted hereinabove, the theory and characteristics of radiant heater 30 are similarly applicable to the case where the ring-shaped element is cooler than the target surface. For example, a chilled fluid such as liquid nitrogen, a fluorocarbon or water, may be circulated through conduits in a ring-shaped aluminum body. Provision of such a radiant cooling apparatus may be preferred for materials which may be useful in selective laser sintering but where the material, at the time of the sintering, must be kept below room temperature in order to remain in powder form. In addition, since cooling of target surface 4 in selective laser sintering is also known to be beneficial in controlling growth and curling, even where the temperature of target surface 4 is heated by radiant heating, an alternative embodiment of the selective laser sintering apparatus of FIG. 8 may include both a radiant heater 30 and a similarly ring-shaped cooling element, with the heater and cooling element disposed coaxially with one another. It is contemplated that other alternatives and modifications incorporating a radiant cooling element will now be apparent to those of ordinary skill in the art.

Figure 10:
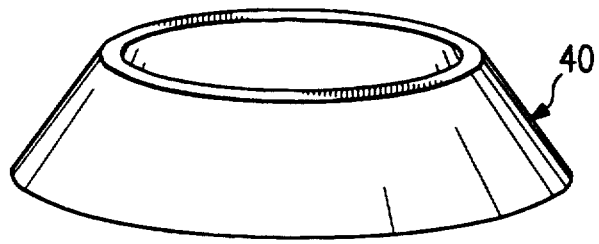
FIG. 10 is an isometric view of a radiant heater according to a second preferred embodiment of the invention.

Referring now to FIG. 10, an isometric view of an alternative embodiment of the radiant heater according to the invention is illustrated. As noted hereinabove relative to FIG. 9, the fraction of the total energy radiated by radiant heater 30 which reaches target surface 4 is less than 50%, especially at the distance a at which uniformity is optimized. Radiant heater 40 of FIG. 10 is a ring-shaped radiant heater constructed to have a frusto-conical shape, rather than the flat shape of heater 20. Radiant heater 40 is preferably mounted so that its inner edge is further away from the surface to be heated than its outer edge.

This construction allows the distance a at which uniformity is maximized for radiant heater 40 to be less than that for flat radiant heater 30. This can be seen from FIG. 6, which indicates that, for a flat radiant heater 30, placement of the heater closer to target surface 4 than the optimal distance results in the center of target surface 4 receiving less energy than the perimeter. Radiant heater 40 of FIG. 10, due to its shape, directs more of its energy toward the center of target surface 4 than toward the perimeter of, and outside the bounds of, target surface 4. By providing more energy toward the center, radiant heater 40 compensates for the effects illustrated in FIG. 9 where the center receives less energy as the heater is moved closer to the surface. Accordingly, the distance a at which uniformity is maximized for radiant heater 40 will be closer to target surface 4 than in the case of radiant heater 30. As indicated in FIG. 7, this closer proximity of heater 40 to target surface 4 will increase the fraction of the total emitted energy which reaches target surface 4, improving the efficiency of radiant heater 40.

It should be noted that, while the shape of radiant heater 40 is frusto-conical, having straight sides between the outer and inner radius, alternative geometries may be utilized for radiant heater 40. For example, the sides of radiant heater may be parabolic rather than linear if desired, for alternative distribution of energy from radiant heater 40 to target surface 4. It is contemplated that other useful shapes of radiant heater 40 will now be apparent to those of ordinary skill in the art having reference to this description and the drawings.

In addition, it should be noted that the shape of radiant heater 40 is also applicable to a similarly shaped cooling element, to achieve improved transfer of radiant heat from the target surface to the element, as discussed hereinabove.

Relative to the selective laser sintering apparatus of FIG. 9, due to the provision of the opening in the center of radiant heater 40, the beam from laser 10 will still be allowed to impinge upon powder at target surface 4. Radiant heater 40 thus provides the further advantages described hereinabove in its application for selective laser sintering.

Figure 11:
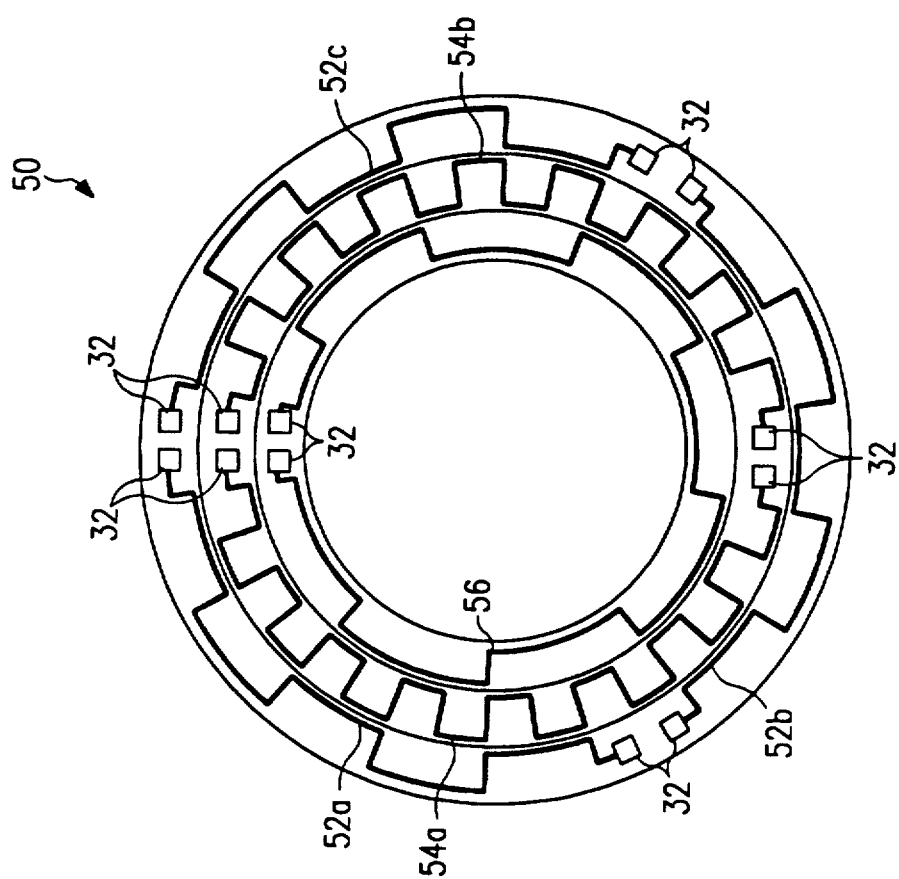
FIG. 11 is a schematic diagram of a radiant heater according to a third preferred embodiment of the invention.

Referring now to FIG. 11, radiant heater 50 according to another embodiment of the invention will now be described in detail. In some applications for which uniform radiant heating is desirable, as described hereinabove, conduction and convection of heat may be uneven for points at the surface being heated. For example, in the application of selective laser sintering, chamber 2 includes a door with a window at the front thereof, to provide visibility of the process from external to the chamber. In addition, it has been found that convection cooling of the target surface is useful, together with radiant heat as described hereinabove, in order to minimize growth within the layer being selectively sintered (i.e., growth of the part from the portion receiving the laser energy via conduction of the laser-generated heat to powder particles which were not exposed to the beam). Such cooling is preferably done by directing air flow in a direction parallel to target surface 4 across the face of the powder and part being produced. In addition, as described in PCT Publication WO 88/02677 cited hereinabove, it may be useful to provide downdraft gas or air flow through the powder, in a direction normal to target surface 4.

However, such air and gas flow may provide uneven temperature distribution at target surface 4, even if radiant heater 30 or 40 is transferring radiant energy to target surface 4 at a rate per unit area which is highly uniform across target surface 4. In addition, while radiant heaters 30 and 40 hereinabove are intended to provide such uniform radiant energy transfer, some amount of deviation will likely still be present. In addition, as described hereinabove, the efficiency of radiant energy transfer increases with the proximity of the radiant heater to target surface 4, especially as the radiant heater is closer to target surface 4 than the distance a at which its uniformity is maximized. Furthermore, non-uniformity in radiant energy transfer is a significant problem with conventional radiant heating in selective laser sintering, for example in the apparatus of FIG. 1.

Referring now to FIG. 11, zoned radiant heater 50 will now be described in detail, in conjunction with such a heater 50 in a ring-shaped configuration. It is contemplated that the zoning described hereinbelow will also be useful in conventional radiant heaters, such as radiant heat panels 20 of FIG. 1, and in such cases may serve to alleviate the non-uniformity of radiant energy transfer to target surface 4.

Radiant heater 50, according to this embodiment, generates radiant energy from resistive elements 52, 54 and 56 disposed at a surface thereof. Resistive elements 52, 54 and 56 are conventional resistive elements as are used in conventional heaters, for example filaments of nickel chromium or the like, having a connecting pad 32 at each end to which electrical connection may be made by soldering a wire thereto or the like. In this embodiment, the density of the length of resistive elements 52, 54 and 56 per unit area of heater 50 varies radially. FIG. 11 shows the resistive elements 52, 54, and 56 with very large spacing, for the purpose of clarity. In practice, elements 52, 54 and 56 are preferably formed to have a higher density. Furthermore, in practice, the connection pads 32 are preferably sized and placed in a manner which does not adversely affect the desired temperature distribution across the face of heater 50. Resistive elements 52a, 52b, and 52c are disposed near the outer perimeter of heater 50, are electrically isolated from one another, and present approximately the same density of resistance per unit area as one another. Resistive elements 54a and 54b are disposed closer to the center of heater 50 from elements 52, and each present a higher density of resistive length per unit area than elements 52 (although the density of resistive length per unit area of elements 54a and 54b are approximately equal). Resistive element 56 is disposed closer to the center of heater 50 than elements 54, and in this embodiment has the lowest density of resistive length per unit area than elements 52 and 54. In this preferred embodiment of radiant heater 50, a hole is provided in the center thereof, for example so that a beam from laser 10 may pass therethrough when heater 50 is installed in an apparatus for selective laser sintering, such as in the example of FIG. 9.

Zoned radiant heater 50 provides significant flexibility in providing radiant heat to target surface 4, especially as useful in a selective sintering apparatus. For example, application of equal currents to each of elements 52, 54 and 56 would result in the emission of radiant energy per unit area which varies radially from the center of heater 50, with the lowest emission near the center, the next highest emission near the outer perimeter, and the highest emission therebetween. In addition, the currents through elements 52, 54 and 56 may be varied relative to one another to provide different emission densities from that incorporated in heater 50 merely due to the varying densities of resistive element length per unit area; varying of the currents relative to one another could, for example, exactly compensate for the varying resistive length densities, so that radiant energy may be emitted at a uniform rate per unit area across the entirety of heater 50. Of course, other radial emission density distributions could be implemented by otherwise varying the current through elements 52, 54 and 56 relative to one another.

In addition, the provision of separate elements 52a, 52b and 52c, as well as separate elements 54a and 54b, provide the ability to angularly vary the radiant energy emission rate per unit area. For example, if a portion of target surface 4 underlying resistive element 52a were cooler than the portions underlying resistive elements 52b and 52c, the current applied to element 52a could be increased relative to that through elements 52b and 52c, resulting in increased radiant energy emitted from the portion of heater 50 containing element 52a. Such control of the individual elements 52 and 54 thus can allow compensation for non-uniform temperatures over target surface 4, such as may result from conduction or convection within chamber 2 in the selective laser sintering apparatus of FIG. 9. In addition, non-uniform temperatures at target surface 4 may also result from the selective laser sintering itself. For example, if the portion of the powder at target surface 4 underlying elements 52b and 52c were sintered to a greater extent than the portions underlying element 52, an increase in the current through element 52a would compensate for the lesser degree of sintering heat thereunder, improving the uniformity of the target surface 4 and the powder and part disposed thereat.

It should be noted that while zoned heater 50 in this embodiment is ring-shaped, alternatively conventional rectangular or circular radiant heat panels may be similarly zoned, in order to provide uniform temperature at the target surface 4, and the powder and part thereat, in an apparatus for selective laser sintering. Further in the alternative, while zoned heater 50 in this embodiment is a flat ring, similar to the non-zoned heater 30 described hereinabove, the zoning approach used in zoned heater 50 is equally applicable to and may be used in the frusto-conical heater 40 also described hereinabove.

It should be noted that radiant heater 50, having numerous pads 32 for each element 52, 54 and 56, both in the radial and angular sense, is especially adapted for real-time control of the temperature during the selective laser sintering process, and during characterization of a particular chamber prior to initiation of the selective laser sintering process for a particular powder material and process conditions (such as ambient temperature, air flow, laser power, and the like). Accordingly, it is contemplated that monitoring apparatus such as thermocouples, or non-contact sensors such as infrared sensor 34 described hereinabove, together with conventional monitoring, feedback and control equipment, may be implemented together with the zoned heater 50 of this embodiment of the invention by one of ordinary skill in the art having reference to this specification.

Further in the alternative to controllable zoned heater 50, a fixed zoned heater may also be used in a manner as to benefit from the invention. It is contemplated that, for a particular design of chamber 2 in a selective laser sintering apparatus, the radiant energy emission density pattern, both in the radial and in the angular sense, may be derived by use of a controllable zoned heater 50 as described hereinabove, and that the emission density pattern may not significantly change for the particular chamber design, regardless of changes in the powder material, ambient temperature, laser power, and other parameters. Accordingly, in such a case, a radiant heater 50 including a single resistive element of varying densities so as to emit radiant energy in a non-uniform pattern from the heater, but which results in uniform temperature at the target surface in compensation for convection or other factors, may be used. Such a heater would have, for example, only two pads 32, one at each end of the resistive element, simplifying the implementation of the heater, and its control.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. An apparatus for sintering a powder, comprising:
    an energy source for providing a focused energy beam to a target surface;
    means for placing powder at said target surface; and
    ring-shaped means for transferring radiant energy relative to said target surface at a substantially uniform rate per unit area, said transferring means having a circular outer edge which is substantially parallel with the plane of said target surface, and having a circular inner edge substantially concentric with said outer edge;
    wherein said transferring means is disposed in such a manner that said energy beam passes through the opening therein defined by said inner edge.

2. The apparatus of claim 1, wherein said transferring means is a cooling element.

3. The apparatus of claim 1, wherein said transferring means is a radiant heater.

4. The apparatus of claim 1, wherein said inner edge of said transferring means is substantially coplanar with said outer edge.

5. The apparatus of claim 1, wherein said inner edge of said transferring means is not coplanar with said outer edge;
    and wherein said transferring means is disposed in such a manner that said inner edge is further away from said target surface than said outer edge.

6. The apparatus of claim 5, wherein said transferring means has a frusto-conical shape.

7. The apparatus of claim 3, wherein said heater comprises:
    a electrically resistive element for generating radiant heat; and
    connecting pads for making electrical connection to said resistive element.

8. The apparatus of claim 7, wherein the density of said resistive element per unit area of said heater varies radially between said inner and outer edges.

9. The apparatus of claim 7, wherein the density of said resistive element per unit area of said heater varies angularly.

10. The apparatus of claim 3, wherein said heater comprises:
    first and second electrically resistive elements for generating radiant heat; and
    a plurality of connections, for providing current to said first and second resistive elements independently from one another.

11. The apparatus of claim 10, wherein said first and second resistive elements have the same density of resistive element per unit area.

12. The apparatus of claim 10, wherein said first and second resistive elements have different densities of resistive element per unit area.

13. The apparatus of claim 10, wherein said first and second resistive elements are disposed in said heater at approximately the same radial distance.

14. The apparatus of claim 10, wherein said first resistive element is disposed in said heater between said second resistive element and said inner edge.

15. An apparatus for sintering a powder, comprising:
    an energy source for providing a focused energy beam to a target surface;
    means for placing powder at said target surface; and
    a radiant heater for providing energy to said target surface, said radiant heater having zones thereof for emitting radiant energy at different rates per unit area.

16. The apparatus of claim 15, wherein said heater comprises:
    a electrically resistive element for generating radiant heat; and
    connecting pads for making electrical connection to said resistive element;
    and wherein the density of said resistive element per unit area of said heater varies radially between said inner and outer edges.

17. The apparatus of claim 15, wherein said heater comprises:
    a electrically resistive element for generating radiant heat; and
    connecting pads for making electrical connection to said resistive element;
    and wherein the density of said resistive element per unit area of said heater varies angularly.

18. The apparatus of claim 15, wherein said heater comprises:
    first and second electrically resistive elements for generating radiant heat; and
    a plurality of connections, for providing current to said first and second resistive elements independently from one another.

19. The apparatus of claim 18, wherein said first and second resistive elements have the same density of resistive element per unit area.

20. The apparatus of claim 18, wherein said first and second resistive elements have different densities of resistive element per unit area.

21. The apparatus of claim 18, wherein said first and second resistive elements are disposed in said heater at approximately the same radial distance.

22. The apparatus of claim 18, wherein said first resistive element is disposed in said heater between said second resistive element and said inner edge.

23. The apparatus of claim 15, further comprising:
    means for monitoring the temperature of the target surface.

24. The apparatus of claim 23, wherein said monitoring means comprises an infrared sensor.

* * * * *